(12) United States Patent
Enderle

(10) Patent No.: US 9,587,170 B2
(45) Date of Patent: Mar. 7, 2017

(54) PROPPANT MATERIAL INCORPORATING FLY ASH AND METHOD OF MANUFACTURE

(71) Applicant: EPROPP, LLC, New York, NY (US)

(72) Inventor: Ralph Enderle, Nuremberg (DE)

(73) Assignee: EPROPP, LLC, New York, NY (US)

( * ) Notice: Subject to any disclaimer, the term of this patent is extended or adjusted under 35 U.S.C. 154(b) by 75 days.

(21) Appl. No.: 13/971,287

(22) Filed: Aug. 20, 2013

(65) Prior Publication Data

US 2015/0057198 A1   Feb. 26, 2015

(51) Int. Cl.
| | |
|---|---|
| C09K 8/80 | (2006.01) |
| C04B 41/45 | (2006.01) |
| C04B 41/50 | (2006.01) |
| C04B 41/52 | (2006.01) |

(52) U.S. Cl.
CPC .......... C09K 8/805 (2013.01); C04B 41/4543 (2013.01); C04B 41/4545 (2013.01); C04B 41/4584 (2013.01); C04B 41/5031 (2013.01); C04B 41/524 (2013.01)

(58) Field of Classification Search
CPC . C09K 8/805; C04B 41/4543; C04B 41/4545; C04B 41/4584; C04B 41/5031; C04B 41/524
USPC .................... 507/269; 427/180, 215
See application file for complete search history.

(56) References Cited

U.S. PATENT DOCUMENTS

| | | | |
|---|---|---|---|
| 4,977,116 A * | 12/1990 | Rumpf | ............ C04B 33/04 166/280.2 |
| 6,406,789 B1 | 6/2002 | McDaniel et al. | |
| 6,582,819 B2 | 6/2003 | McDaniel et al. | |
| 6,632,527 B1 | 10/2003 | McDaniel et al. | |
| 7,032,664 B2 | 4/2006 | Lord et al. | |
| 7,036,592 B2 | 5/2006 | Nguyen et al. | |
| 7,160,844 B2 | 1/2007 | Urbanek | |
| 7,459,209 B2 | 12/2008 | Smith et al. | |
| 7,803,740 B2 | 9/2010 | Bicerano et al. | |
| 7,828,998 B2 | 11/2010 | Luscher et al. | |
| 7,867,613 B2 | 1/2011 | Smith et al. | |
| 7,883,773 B2 | 2/2011 | Smith et al. | |
| 7,887,918 B2 | 2/2011 | Smith et al. | |
| 7,902,125 B2 | 3/2011 | Bicerano et al. | |
| 7,914,892 B2 | 3/2011 | Smith et al. | |
| 8,003,212 B2 | 8/2011 | Smith et al. | |
| 8,012,533 B2 | 9/2011 | Smith et al. | |
| 2005/0019574 A1 | 1/2005 | McCrary | |
| 2007/0036977 A1 | 2/2007 | Sinclair et al. | |
| 2008/0015103 A1 | 1/2008 | Luscher et al. | |
| 2008/0096018 A1 | 4/2008 | Zhang et al. | |
| 2010/0224755 A1 | 9/2010 | Eising et al. | |
| 2013/0022816 A1 | 1/2013 | Smith et al. | |
| 2013/0055924 A1 | 3/2013 | Seo et al. | |
| 2013/0161003 A1* | 6/2013 | Makarychev-Mikhailov | ............ C09K 8/685 166/280.1 |

FOREIGN PATENT DOCUMENTS

WO   02092530 A1   11/2002

OTHER PUBLICATIONS

International Search Report of the International Searching Authority (US for international application PCT/US2014/050806 dated Oct. 3, 2014.
Written Opinion of the International Searching Authority (US for international application PCT/US2014/050806 dated Oct. 3, 2014.

* cited by examiner

Primary Examiner — Frances Tischler
(74) Attorney, Agent, or Firm — Basil M. Angelo; Angelo Mikeska PLLC

(57) ABSTRACT

A relatively low density, high strength round proppant material having (i) a round core made of a sintered mixture of fly ash and clay or, in some instances, fly ash, clay, and bauxite; and (ii) an outer shell made of sintered bauxite, and a method of making the same.

9 Claims, No Drawings

PROPPANT MATERIAL INCORPORATING FLY ASH AND METHOD OF MANUFACTURE

FIELD

Embodiments described herein generally relate to proppant materials which may be used in hydraulic fracturing operations in oil and gas wells, and methods of manufacturing the same.

Hydraulic fracturing is the fracturing of various rock layers by a pressurized liquid. This is useful in oil and gas operations, as the fractures created by the hydraulic fracturing can serve as enhanced flow paths to the well for oil or gas trapped in rock formations. However, once the fractures have been created, they must be "propped" open by some means because otherwise the fractures will close when the pressure from the high pressure liquid used to create the fractures is relieved.

Crush resistant particles, referred to as "proppant", may be pumped into the fractures after they have been created to hold the fractures open. It is desirable that such proppant materials be both very crush resistant (so that the forces exerted on them by the fractures as they try to close do not crush them, which would permit the fractures to close) and have a relatively low specific gravity (so that they may be transported easily into the fractures by a fluid pumped into the well). These two properties often can be somewhat at odds with each other, because an increase in crush resistance typically tends to result in a material being more dense.

Because proppant materials typically are sold by weight rather than by volume, a proppant material having a relatively low density will actually have a lower effective cost to the user even if it is sold at the same price per pound as a more dense proppant material It is also desirable that the proppant particles be relatively spherical to maximize the spaces between proppant particles and the ease with which fluids will flow through such spaces. Depending on the proppant material, crushing of proppant particles can result in the creation of many very fine particles which could block some of the spaces between the remaining larger proppant particles, reducing the ability of fluids to flow through those spaces. Accordingly, it is desirable that, when the crush strength of the proppant material is exceeded, the proppant particles break into a few relatively large fragments rather than become pulverized.

Depending on the application, different sizes of proppant particles may be used, although it is desirable that the proppant particles be of a relatively uniform size.

Bauxite is a common aluminum ore. Bauxite is composed primarily of one or more aluminum hydroxide minerals, plus various mixtures of silica ($SiO_2$), iron oxide, titania ($TiO_2$), aluminosilicate, and other impurities in minor amounts. Sintered bauxite has been used in the past as a proppant material because particles made essentially from bauxite, when sintered, form a relatively hard, crush resistant material. However, bauxite has a relatively high specific gravity and sintered bauxite is considered a relatively heavy-weight (i.e., higher density) ceramic proppant material. Moreover, the quality requirements for bauxite used to make a sintered bauxite proppant material are very strict. There are only a relatively few sources of bauxite that are suitable for producing a sintered bauxite proppant material because of the impurities present in most bauxites.

The present invention relates to lighter weight (i.e., lower density) ceramic proppant materials made containing a substantial proportion of fly ash. Fly ash comprises the fine particles that rise with the flue gases, and in industrial applications usually refers to ash particles produced during the combustion of coal. The components of fly ash vary considerably, but all fly ash includes substantial amounts of silicon dioxide ($SiO_2$) and, in some cases, substantial amounts of calcium oxide (CaO) and/or ferric oxide ($Fe_2O_3$), which are components of many coal-bearing rock strata. Other components of the fly ash depend upon the specific coal bed makeup.

An advantage of using fly ash in the present application is that it has a relatively low density compared to bauxite (the specific gravity of bauxite may vary from about 2.5 to 3.5, depending on its specific composition, while the specific gravity of fly ash may vary from about 2.0 to 2.5).

Moreover, disposal of the fly ash has become an increasing problem with significant environmental implications, making opportunities for the recycling of fly ash desirable. Currently, most fly ash produced from coal-fired power stations is disposed of in landfills and ash ponds. The single largest recycling use at present for fly ash is to replace a portion of the Portland cement content in concrete. The present invention permits recycling of fly ash waste into a material that is useful in hydraulic fracturing operations in oil and gas wells.

Moreover, while the quality requirements for bauxite used to make a sintered bauxite proppant material are very strict, the bauxite used in the present invention need not be of such a high quality.

The proppant materials associated with this invention have relatively high crush resistance and relatively low density, and are relatively inexpensive. In addition, when a proppant particle associated with this invention fails, it tends to fracture into a relative few, large pieces rather than become pulverized.

DESCRIPTION OF RELATED ART

While fly ash has been proposed to be used to make an aggregate material for use in concrete or building materials as a component of a proppant material, past efforts to make a commercially successful ceramic proppant material containing a significant amount of fly ash have failed. The aggregate formed by sintering briquettes of fly ash containing materials and then crushing the briquettes and screening the crushed particles to obtain suitable sized particles is not be satisfactory for use as a proppant material. The shapes of the particles formed by crushing are so irregular that they are not sufficiently spherical to make a good proppant material and the irregular shapes of the particles also reduces their crush resistance.

A particle which is suitably crush resistant to serve as a proppant may be made by sintering spherical granules formed from a mixture of fly ash, bauxite, and clay. However, to obtain the desired degree of crush resistance, the sintering step typically must be performed at a temperature above what will typically cause such granules to become very sticky as a result of melting of some of the components of the materials in the mixture, particularly one or more of the components of (including impurities in) the fly ash. If the granules become too sticky during the sintering step, they will agglomerate, which results in a poor yield of uniformly sized particles of a specific size. Moreover, excessive stickiness will cause the granules to adhere to the kiln in which they are being sintered, reducing the yield and damaging the kiln.

U.S. Pat. No. 7,828,998 discloses making proppant from granules made from kaolinite, bauxite, fly ash, and combinations thereof. However, in U.S. Pat. No. 7,828,998, the granules are heated initially under reducing conditions so that at least part of the metal oxide dopant is reduced to form a metastable, transient liquid phase among the particles. This liquid phase includes at least part of the reduced metal oxide dopant, promotes sintering among the particles, and forms islands of reduced metal oxide dopant within and on the surface of the granules. Following the heating under reducing conditions, the granules are heated under oxidizing conditions such that the islands of reduced metal oxide are oxidized and/or go into solid solution within the particles, thereby creating voids within and forming a metal or metal oxide shell on the granules.

The present invention does not require heating the granules under reducing conditions followed by heating the granules under oxidizing conditions. Instead, the granules are treated prior to heating in a manner that obviates the stickiness problem otherwise encountered when heating the granules to the required sintering temperature.

Other prior art has created relatively low density proppant materials which required the use of nano-scale raw materials. The present invention does not require the use of raw materials smaller than d90<10µ (90% of the particles are less than 10µ in size). Using feedstocks with a nano-scale particle size greatly increases the cost of the feedstocks and the finished product to non-economic levels.

SUMMARY

The invention relates to a method of manufacturing a proppant material in which the fly ash is a significant component of the final product, preferably the primary component of the proppant material. The proppant material has a core comprising fly ash, bauxite, and clay, or in some instances fly ash and clay. To prevent excessive stickiness on the surface of the granules when heated to sintering temperatures, the core granules (which contain a substantial amount of fly ash) are coated with bauxite. In certain embodiments, the core granules receive multiple coatings of bauxite, which improves adherence of the coating to the core granule as compared to a particle given a single-layer coating. In other embodiments, the core granules are coated with one or more layers of bauxite, but the application of the bauxite is in the form of a powdered bauxite slurry, in which the powdered bauxite is mixed with a carrier liquid, such as water or another suitable carrier liquid. In yet other embodiments, the powdered bauxite slurry includes both water and a binder. In some embodiments, the binder is polyvinyl alcohol ("PVA"), which acts as both an emulsifier and a binder.

The coated granules are then heated to a calcination temperature to remove the water and other volatile materials otherwise contained in the granules. After calcination, the granules are heated to a sintering temperature to form high strength ceramic proppant particles having a relatively low density.

DETAILED DESCRIPTION

To form a high strength proppant material having a relatively low density, a spherical granule is formed from a combination of fly ash, clay, and bauxite. While the descriptive term "spherical" is used herein, it is understood that the granules formed will not necessarily be perfect spheres, but instead will be sphere-like, i.e., well rounded with the major and minor axes of the granule be approximately the same, but not necessarily exactly the same. In other words, the "spheres" may be slightly elliptical or otherwise deviate from being perfect spheres, but will be very rounded and approximate spheres.

The clay acts as a plasticizer to promote formation of the desired granules and provide them with a measure of physical stability prior to the sintering of the granule. In the embodiments discussed in detail below, kaolin clay is used; but it is understood that illite or other clay materials with suitable characteristics may be used.

It is understood that the composition of the raw materials, including the nature and the amounts of various impurities which naturally occur in the raw materials, will affect the relative proportions of the raw materials used and may require appropriate adjustments to the times and amounts of water added to form satisfactory granules.

The chemical composition of different fly ashes can be substantially different. Fly ash with an excessively high iron oxide content can present economically insurmountable problems because of the degree of stickiness which results. Best results were achieved with fly ash having an iron oxide content of about 4%. Using a fly ash containing in excess of 12% iron oxide can caused insurmountable problems of sticking in the kiln. Iron content in the fly ash should be less than 12%, preferably about 7% or less, and most preferably about 4% or less.

The invention is suitable for making proppant materials from proppants using fly ash from the combustion of various types of coal (e.g., lignite, bituminous, and anthracite coals). Lignite fly ash typically contains a much higher proportion of CaO (and therefore smaller proportions of $SiO_2$ and $Al_2O_3$) than bituminous or anthracite fly ash. Using lignite fly ash, the proportion of bauxite in the core granule can be reduced; in some embodiments, very strong proppant materials could be made without including any bauxite in the core particle—i.e., making the core particles of fly ash and clay. In such embodiments, bauxite is used only as a coating material. Moreover, a single, relatively light coating of bauxite may be used with core granules made using lignite fly ash (e.g., an amount of bauxite equal to about 5% or less of the total weight of the dry ingredients).

Prior to mixing, the fly ash, clay, and bauxite are in powdered form, as described below. In one embodiment, the specifications for the fly ash, the clay, and the bauxite are as shown in Tables 1-3 below, respectively (it is recognized that the total % may be slightly more or less than 100%—this is the result of rounding of some of the values in the table):

TABLE 1

| Fly Ash | |
| --- | --- |
| Compound | % |
| $SiO_2$ | 66.0 |
| $Al_2O_3$ | 22.6 |
| $Fe_2O_3$ | 4.0 |
| $TiO_2$ | 0.6 |
| $K_2O$ | 2.5 |
| MgO | 0.2 |
| $Na_2O$ | 0.3 |
| CaO | 0.3 |
| $SO_3$ | 0.2 |
| LOI | 5.2 |

TABLE 2

Clay (Kaolin)

| Compound | % |
|---|---|
| $SiO_2$ | 59.78 |
| $Al_2O_3$ | 25.84 |
| $Fe_2O_3$ | 1.86 |
| CaO | 0.39 |
| MgO | 0.54 |
| $K_2O$ | 2.08 |
| $Na_2O$ | 0.38 |
| $LOI_{1000°\ C.}$ | 7.28 |

TABLE 3

Bauxite

| Compound | % |
|---|---|
| $Al_2O_3$ | 86 min. |
| $SiO_2$ | 8 max. |
| $Fe_2O3$ | 2 max. |
| $TiO_2$ | 4 max. |
| $K_2O + Na_2O$ | 0.3 max. |
| $CaO + MgO$ | 0.6 max. |

The fly ash and the bauxite are both ground to d90<10μ. The clay is ground to d90<12μ.

The dry ingredients used in certain embodiments described below and their respective percentages of the total are set forth in Table 4 below:

TABLE 4

Dry Ingredients

| Material | Weight (g) | % Core | % Total |
|---|---|---|---|
| Fly Ash | 1,522 | 69% | 62% |
| Clay | 326 | 15% | 13% |
| Bauxite (core) | 350 | 16% | 14% |
| Bauxite (1st coating) | 100 | — | 4% |
| Bauxite (2nd coating) | 150 | — | 6% |

In the embodiments discussed in detail below, granulation is accomplished using an Eirich R02 mixer (with the pin tool) in the embodiments discussed below. However, it is understood that other high shear granulating mixers or other granulating/pelletizing mixers or technologies may be used to form the granules, with appropriate adjustments to the times and amounts of water added to form satisfactory granules. Similarly, while the Eirich mixer also is used to coat the granules, it is understood that other mixers or equipment for powder coating or spray (with a slurry) coating the granules may be used and still be within the scope of the invention.

The specifications for the tools and settings on the mixer are shown in Table 5 below:

TABLE 5

| Mixer Specifications/Settings | | | |
|---|---|---|---|
| Granulation tool 1—diameter | | 0.136 m | |
| Granulation tool 2—diameter (Pin Type) | | 0.136 m | |
| Rotor | A | B | C |
| V-belt setting | | | |
| Rotational speed—Level 1 [rpm] | 900 | 1500 | 2500 |
| Rotational speed—Level 2 [rpm] | 1800 | 3000 | 5000 |
| Rim speed [m/s] | | | |
| Level 1 | 6.41 | 10.68 | 17.80 |
| Level 2 | 12.82 | 21.36 | 35.60 |

The protocol for granulation of the raw materials involves (i) granulation of the raw ingredients plus water to form the core granules; and (ii) coating of the core granules with powdered bauxite (added either in powder form or as a powder rich slurry spray). In some embodiments, more than one coating of the core granules may be desirable to enhance adherence of the coating to the core granules.

By using multiple coatings, the composition of each layer coating may be varied somewhat. In some embodiments, the coating material used in successive layers may contain different amounts of bauxite to provide a transition of the composition from the core particle material to the outermost layer of the bauxite coating.

An additional step of finishing of the coated granules to enhance roundness also may be desirable in some embodiments.

Referring to the steps shown in Table 6 below and the mixer settings and times shown, such a protocol is implemented in some embodiments as discussed below.

TABLE 6

| | Settings | | Rim Speed [m/s] | | Mixing Principle | | Water Addition | Time |
|---|---|---|---|---|---|---|---|---|
| Step | Rotor | Pan | Rotor | Pan | [ccf/cf] | Step Description | (g) | [s] |
| 1 | C1 | 2 | 17.80 | 2 | ccf | Dry mix | 0 | 60 |
| 2 | C1 | 2 | 17.80 | 2 | ccf | Water addition | 380 | 15 |
| 3 | C2 | 2 | 35.60 | 2 | ccf | Water addition | | 60 |
| 4 | C2 | 2 | 35.60 | 2 | ccf | Microgranulation | 0 | 120 |
| 5 | B2 | 2 | 21.36 | 2 | ccf | Growth of microgranules | 0 | 120 |
| 6 | A2 | 2 | 12.82 | 2 | ccf | Round granules | 0 | 30 |
| 7 | A2 | 2 | 12.82 | 2 | ccf | First powder coating | 0 | 60 |
| 8 | A2 | 2 | 12.82 | 2 | ccf | Second powder coating | 0 | 30 |
| 9 | A1 | 2 | 6.41 | 2 | ccf | Finishing | 0 | 60 |

The dry, powdered raw materials (fly ash, clay, and bauxite) for the granule cores are combined in the mixer (step 1). In this embodiment, the followings amounts of the powdered raw materials were added to the mixer in step 1: fly ash—1,522 g; clay—326 g; and bauxite—350 g. This will result in the granule cores being about 70% fly ash, about 15% bauxite, and about 15% clay. Water is added smoothly as a spray to the powdered raw materials as they are mixed to form a cohesive material (steps 2-3). The water is preferably added in two steps to minimize dust escaping from the mixer—a small amount of water is added at first with the mixer at low speed until the raw materials have been wetted, and the remainder is added with the mixer at higher speed. After the raw materials and water have been mixed, the core granules are formed in the mixer (steps 4-6). First, microgranules are formed from the raw material and water mixture. The microgranules are then grown to the desired size. After the core granules have been grown, the granules receive one or more coatings (steps 7-8). In some embodiments, it may be desired to finish the coated granules in the mixer to further enhance roundness (step 9).

The protocol described in Table 6 is suitable for making proppants in the range of 20-50 mesh, but with appropriate modifications can be used to make proppant materials in the range of 16-30 mesh, 40-70 mesh, or even smaller than 40-70 mesh; pretty much any commercially desired size range is feasible. The moisture content after granulation in this particular embodiment is in the range of 13-15 Ma. %. It is understood that the targeted residual moisture content may vary depending on the composition of feedstocks used, including the relative proportions of the feedstocks and their individual specifications (e.g., constituent components and impurities, particle size, etc.). Generally, the residual moisture content should be in the range of 10-25 Ma. %, and preferably in the range of 10-20 Ma. %. By relatively small changes in the moisture content, temperature, and the time allotted to growth of the microgranules, different particle size distributions can be achieved.

For up-scaling of the process, it is helpful to properly control the rim speed. Especially during the first part of the granulation process, it is essential to use a higher rim speed to form microgranules with a good particle size distribution. These microgranules can then be grown to very round granules later using a lower rim speed. Rim speed during the different steps is shown in Table 6.

After creating microgranules with a good size distribution, the rim speed of the rotor should be decreased to ensure proper growth of the granules. The speed of the rotor still needs a relatively high value to ensure good distribution. If the speed is too low, large lumps can be formed on the granules which can result in a bad distribution and a poor yield. Growth of the granules continues until the granules have reached the desired size. At this point, the granules are the proper size, but are not very well rounded.

To better round the granules, the rotor speed is reduced and the granules are rounded for a relatively brief period of time. The time should be as short as possible, but as long as necessary to get reasonably round granules. If the time is too long, the granules will start to grow again at the low rotor speed.

The first coating step ensures that the size of the granules remains the same. In this embodiment, because the core granules are going to be coated twice, about 100 g. of powdered bauxite (about 4% of the total dry ingredient weight) is added to the mixer to stop the growth of the granules and to permit further rounding of the granules in the mixer. After 60 seconds of rounding, the coated granules are well rounded and there is good adhesion of the coating material on the granules.

In the second powder coating step, about 150 g. of powdered bauxite (about 6% of the total dry ingredient weight) is added to the mixer. The differences in the composition of the core granule, the first layer of powder coating, and the second layer of powder coating can provide a good transition in the composition of the materials in the layers, which promotes good adhesion of the coating to the core. In other embodiments, more layers or layers having varying compositions may be used, but two layers of bauxite powder coating provides a significant improvement over a single layer of coating in the adhesion of the coating to the core granule.

In some embodiments in which the core granules are coated twice (i.e., two layers of coating), the granules receive a first coating of powdered bauxite equal to about 2%-10%, preferably 3%-6%, more preferably 4%-5% of the total weight of the dry ingredients to stop the growth of the granules and to permit further rounding of the granules in the mixer for extended time. The granules then receive a second coating of powdered bauxite equal to about 4%-15%, preferably 5%-10%, more preferably 6%-8% of the total weight of the dry ingredients.

As noted above, the coating step in some embodiments may be accomplished by spraying the granules with a slurry rich in powdered bauxite rather than adding the powdered bauxite in dry form. In some embodiments using a bauxite rich slurry to coat the granules, PVA or another suitable binder is included in the slurry (the PVA acting as both an emulsifier and a binder). If the coating is applied as a slurry rather than as a powder, the weight of the powdered bauxite in the slurry is added to the dry ingredient weight for purposes of determining the total dry ingredient weight referred to herein.

After the bauxite coating or coatings have been added to the core, the granules may be sieved.

The green strength of the coated granules is very good—it is not difficult to sieve and calcinate the green material using standard methods. The granules are then calcinated in suitable kiln, such as a rotary kiln, at a temperature of about 900° C.-1150° C., preferred 950° C.-1150° C., more preferred 1050° C.-1080° C. for about 2-60 minutes, preferably 10-30 minutes, or most preferably 15-20 minutes. The temperature of a rotary kiln typically is somewhat higher than the actual sintering temperature in the sintering bed inside the kiln tube (which may be read by a thermocouple), so the kiln temperature may be on the order of about 1050° C.-1350° C., depending on the kiln. Calcination of the material at too high a temperature could result in the crystalline water and other volatile materials being released too fast, which could lead to cracks in the green material which in turn would weaken the structure of the proppant material and limit its maximum strength.

The calcined granules are then sintered in a suitable kiln, such as a rotary kiln, at a temperature of at least 1200° C. (again, the kiln temperature may be somewhat higher that the sintering temperature in the sintering bed). By using this method of manufacture, in which the core granule is formed from a mixture of fly ash, bauxite, and clay, and subsequently is coated with bauxite, the maximum sintering temperature can be increased to about 1240° C.-1280° C. without significant sticking of the granules to each other during sintering (again, the kiln temperature may be somewhat higher that the sintering temperature in the sintering bed, which may be on the order of about 1380° C., depending on the kiln).

It is understood that the calcination and the sintering steps described above may be performed in separate kilns or in different sections of the same kiln as the material passes through the kiln.

For proppant made using lignite fly ash, the sintering temperature may be lower. For example, if lignite fly ash is used, a combination calcination/sintering step may be used at a temperature of about 1080° C.-1100° C.

If a rotary kiln is used, there may be a small amount of sticking to the kiln tube, but it should not be excessive.

Crush testing of the proppant material produced in the manner described above indicated a compressive strength in excess of 10,000 psi. Compressive strength of the proppant material is dependant to a large degree on particle size. The embodiment described above achieved a compressive strength in excessive of 11,000 psi for 20/40 mesh proppant material, while a 30/50 mesh proppant material embodying the invention achieved a compressive strength over 13,000 psi.

What is claimed is:

1. A method for manufacturing a round proppant material comprising:
   forming round granules comprising fly ash, bauxite, and clay wherein the fly ash is the primary component by weight;
   coating said round granules with a coating comprising bauxite to form coated round granules;
   calcining said coated round granules at a temperature in a range between 900° C. and 1150° C.; and
   sintering said coated round granules at a temperature of at least about 1200° C.

2. The method of claim 1 in which said coating comprising bauxite is applied in more than one layer.

3. The method of claim 1 in which said coating is applied in powder form.

4. The method of claim 1 in which said coating is applied in the form of a slurry containing powdered bauxite.

5. The method of claim 1 in which said coating is applied in the form of a slurry comprising powdered bauxite and a binder.

6. The method of claim 5 in which said binder comprises polyvinyl alcohol.

7. The method of claim 2 in which at least one of the layers of said coating contains a larger total amount of bauxite than a previously applied layer.

8. The method of claim 1 in which said coated round granules are sintered at a temperature of about 1240° C.-1280° C.

9. The method of claim 1 in which said round proppant material has a comprehensive strength of at least 10,000 psi.

* * * * *